United States Patent

Vorosmarti

[11] Patent Number: 5,924,442
[45] Date of Patent: Jul. 20, 1999

[54] COUNTERTORQUE ASSEMBLY FOR AUTOMATIC VALVE ACTUATOR

[75] Inventor: James Vorosmarti, Center Valley, Pa.

[73] Assignee: Capital Controls Company, Inc., Colmar, Pa.

[21] Appl. No.: 08/899,463

[22] Filed: Jul. 23, 1997

[51] Int. Cl.⁶ .......................... F16K 31/124; F16K 43/00
[52] U.S. Cl. .......................... 137/315; 81/57.24; 81/57.4; 251/58; 251/59; 251/292
[58] Field of Search ................... 137/78.1, 78.5, 137/315; 81/57.24, 57.4; 251/58, 59, 230, 250, 291, 292, 293; 74/25

[56] References Cited

U.S. PATENT DOCUMENTS

| | | | |
|---|---|---|---|
| 4,629,157 | 12/1986 | Tsuchiya et al. | 251/58 |
| 4,637,423 | 1/1987 | Gray | 251/62 |
| 4,665,386 | 5/1987 | Haws | 251/292 |
| 5,579,801 | 12/1996 | Pye et al. | 251/58 |

OTHER PUBLICATIONS

Single page of Capital Controls literature entitled "Gas Shutdown Systems".

Single page of drawing entitled "Shutdown Mechanism".

*Primary Examiner*—George L. Walton
*Attorney, Agent, or Firm*—Howson and Howson

[57] ABSTRACT

A countertorque arm assembly mounts onto a pressure cylinder valve body for cradling an actuator that operates to rotate the valve stem in response to a sensed condition.

10 Claims, 2 Drawing Sheets

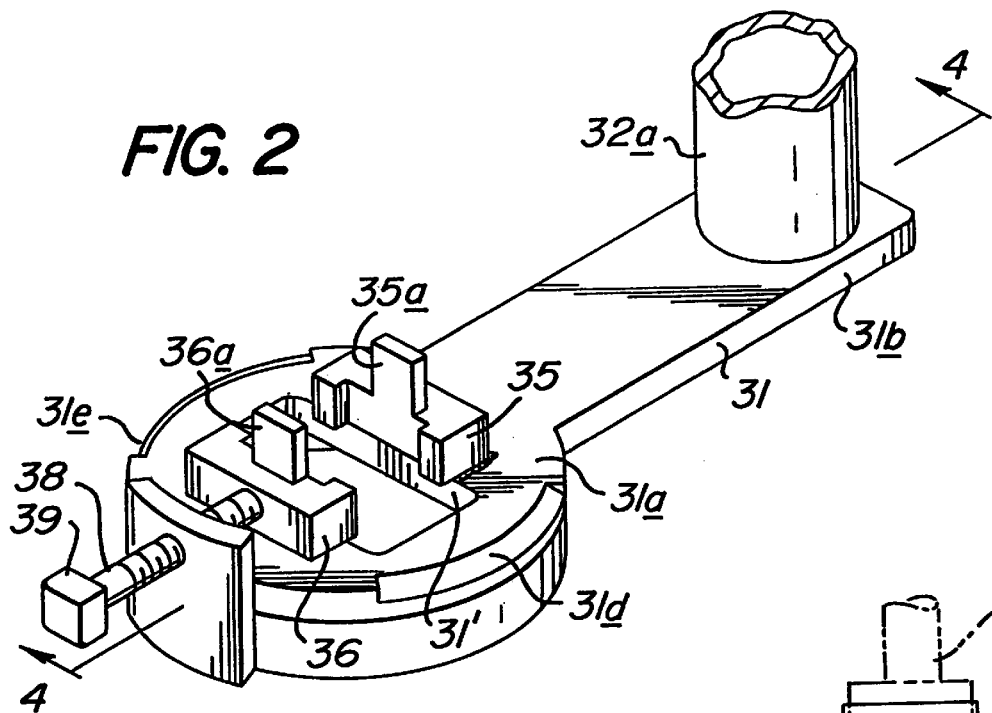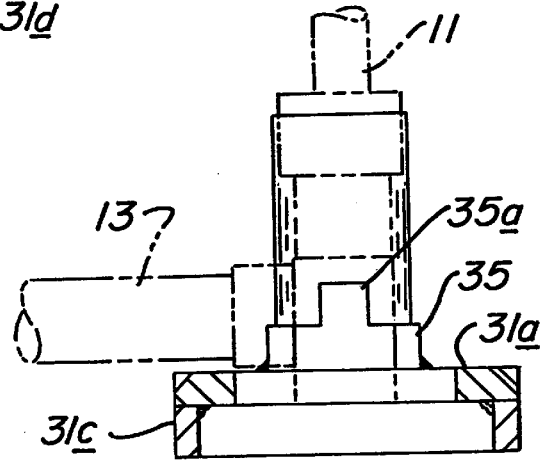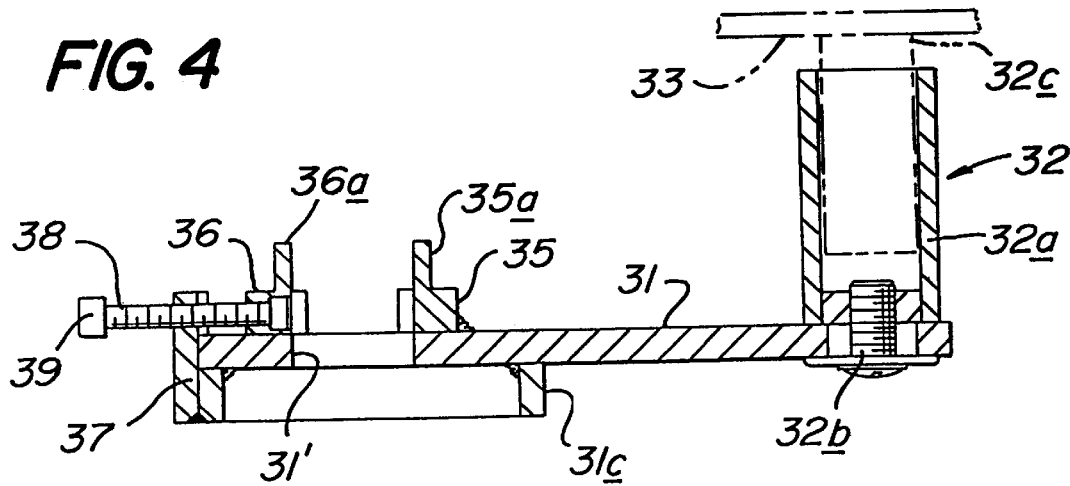

COUNTERTORQUE ASSEMBLY FOR AUTOMATIC VALVE ACTUATOR

FIELD OF THE INVENTION

The present invention relates to automatic pressure cylinder valve actuators, and more particularly, the present invention relates to a countertorque assembly used to mount an automatic valve actuator to a pressure cylinder valve body.

BACKGROUND OF THE INVENTION

Pressure cylinders that contain liquified gases, such as chlorine, used in water treatment processes, are customarily provided with a main outlet valve having a stem and a lateral outlet for connection to a vacuum regulator or other dispensing control device. Small cylinders, such as 150 lb. gas capacity, are usually disposed upright so that the outlet valve is located at the top of the cylinder with the valve stem projecting upwardly. With the cylinder thus disposed, and the valve open, gas may be drawn from the cylinder by means of known equipment such as sold by the assignee of the present application.

In certain installations, it is desirable for the valve to close automatically in response to some condition, such as sensed gas leakage. For this purpose, automatic valve actuators have been used. One such actuator, used by Applicant, employs an air operated rachet which is connected to the valve stem and a source of air under pressure. When air is supplied in response to a sensed condition, the rachet rotates to close the valve and halt the flow of gas from the cylinder.

Heretofore, the valve actuator has been mounted on a complex framework secured to a wall adjacent the pressure cylinder. The framework is designed to enable the actuator to be raised and lowered into operative engagement with respect to the cylinder valve stem for ready installation and removal of filled and depleted cylinders. It has been discovered, however, that when such apparatus is used to close a valve, it has been necessary to secure the cylinder against rotation in response to actuation of the rachet in order to insure that the cylinder does not rotate with the rachet and thereby preclude closing of the cylinder, particularly when the cylinder contains a minimal amount of gas, and hence is light in weight. This has been accomplished by strapping the cylinder to a stationary object, such as the adjacent wall.

While the aforedescribed actuator and cylinder mounting arrangement has been satisfactory, there is a need for a simpler actuator mounting arrangement which can be manufactured economically and installed readily without the need for special tools or skills.

OBJECTS OF THE INVENTION

With the foregoing in mind, an object of the present invention is to provide a novel automatic valve actuator mounting assembly which overcomes the limitations of known prior art mounting assemblies.

Another object of the present invention is to provide an improved automatic valve actuator mounting assembly which mounts directly on the body of a valve installed on a pressure cylinder.

A further object of the present invention is to provide a simple automatic valve actuator countertorque mounting assembly which may be readily mounted on, and dismounted from, the main valve body of a pressure cylinder, that is simple to install readily without special tools and with a minimal amount of skill, and that can be manufactured economically.

SUMMARY OF THE INVENTION

More specifically, the present invention provides a countertorque assembly for mounting an automatic valve actuator to a pressure cylinder having a main valve body with a stem and a lateral outlet. The countertorque assembly comprises an elongate arm having a proximal end portion which is disposed adjacent to the valve body and a distal end portion which carries means for connecting the valve actuator to the arm. The proximal end portion of the arm includes means for anti-rotatably fastening it to the valve body with the arm extending laterally of the valve stem. When torque is applied by the actuator to rotate the valve stem, as to close the valve, the torque is countered by the valve body reacting against the arm.

BRIEF DESCRIPTION OF THE DRAWINGS

These and other objects, features and advantages of the present invention should become apparent from the following description when taken in conjunction with the accompanying drawings, in which:

FIG. 2 is a perspective view in partial cross-section of the assembly illustrated in FIG. 1;

FIG. 3 is a transverse sectional view taken on line 3—3 of FIG. 1; and

FIG. 4 is a longitudinal sectional view taken on line 4—4 of FIG. 2.

DESCRIPTION OF THE PREFERRED EMBODIMENT

Figure 1:
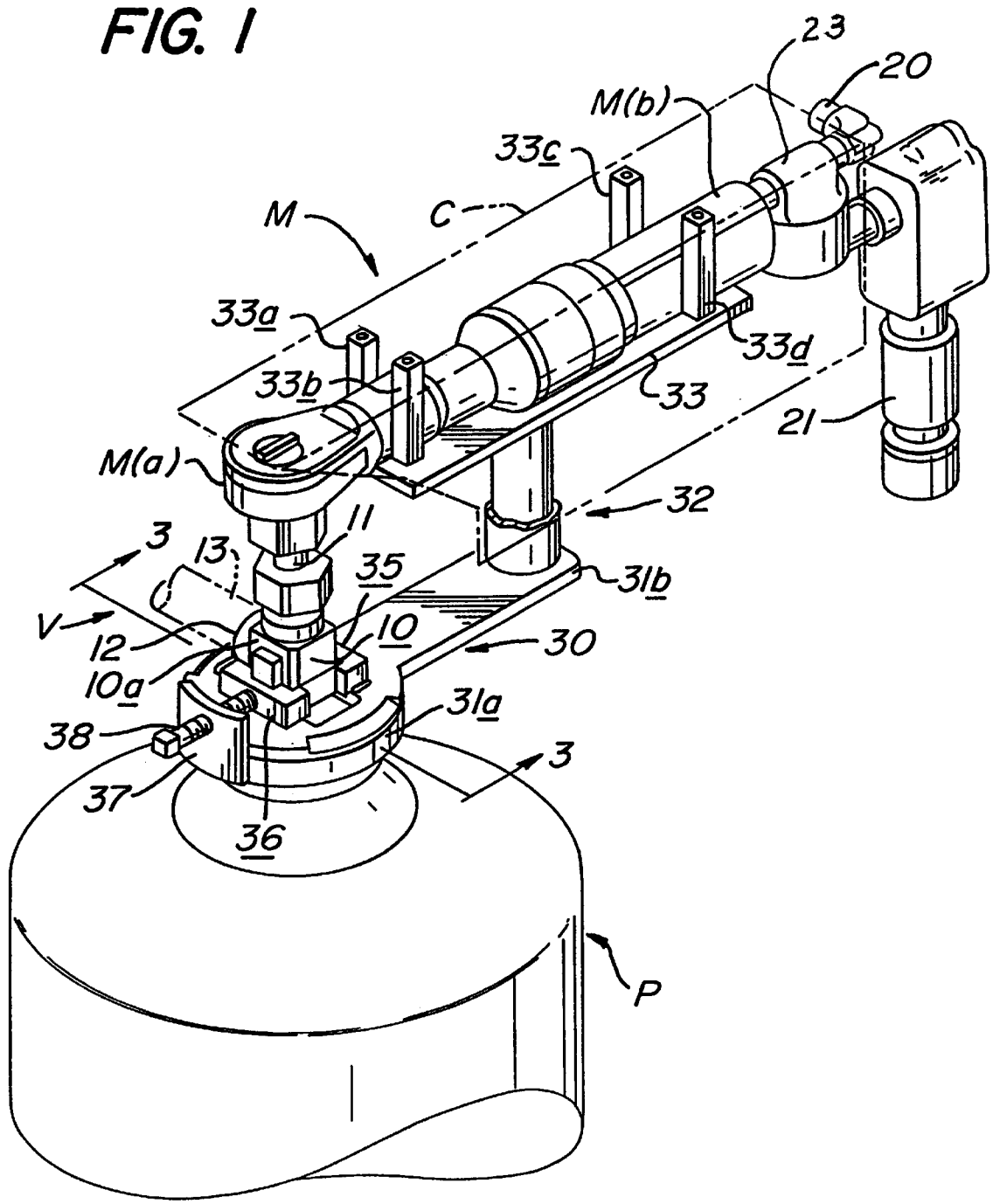
FIG. 1 is a perspective view of a pressure cylinder having a valve mounting the automatic valve actuator countertorque assembly.

Referring now to the drawings, FIG. 1 illustrates a pressure cylinder P having a valve assembly V mounted at its upper end when the pressure cylinder P is disposed upright as shown. The valve assembly V is of conventional construction and has valve body 10 with a pair of opposed flat surfaces, such as the obverse surface 10a, extending in spaced parallel relation on opposite sides of a rotary valve stem 11 extending vertically upward from the valve body 10. The valve V has a lateral outlet 12 to which may be connected various devices such as a pressure regulator, or nipple, such as shown in phantom by the reference numeral 13. When the valve stem 11 is rotated in one direction, the valve V opens, and when it is rotated in the opposite direction, the valve V closes.

In order to rotate the valve stem 11 for the purpose of closing the valve V in response to a sensed condition, such as gas leakage in the vicinity of the pressure cylinder P, it has been known to provide an air operated motor, or actuator, M for rapidly rotating the valve stem 11 into a closed position. The motor M has a wrench portion M(a), which has internal flats releasably engaging like flats on the valve stem 11 and a power portion M(b) which is connected to a source of air under pressure by means of conduit 20. A conduit 21 supplies a signal to an air control valve 23.

In operation, a sensing of gas in the vicinity of the pressure cylinder P by means of a gas sensor (not shown) causes a signal to be supplied to the control valve 23 for enabling the high pressure air supplied via conduit 20 to power-up the motor M to rotate the wrench portion for causing the valve stem 11 to rotate into a closed position for closing the valve V rapidly.

As noted heretofore, various devices have been provided in an effort to prevent the motor M from counter-rotating in response to rotation of the valve stem 11 during closing. These various countertorque devices have not been entirely commercially satisfactory for a variety of manufacturing and operational reasons.

According to the present invention, a countertorque assembly 30 is provided for mounting directly to the body 10 of the valve V and for supporting the motor M in a manner that prevents the motor M from counter-rotating in response to rotation of the valve stem 11 during closing of the valve V and yet permits ready dismounting to afford efficient cylinder changing.

Referring now to FIG. 1, the countertorque assembly 30 comprises a elongate arm 31 having a proximal end portion 31a located adjacent to the pressure cylinder P and a distal end portion 31b remote from the pressure cylinder P. A means is provided for connecting the motor M to the distal end portion 31b of the arm 31. To this end, as best seen in FIGS. 1 and 4, the connecting means includes a post assembly 32 which extends vertically between the distal end portion 31b of the arm 31 and a cradle 33 which receives and supports the body of the motor M. In the illustrated embodiment, the post assembly 32 includes a vertical tubular member 32a fastened to the distal end portion 31b of the arm 31 by means of a threaded bolt 32b which extends upwardly through a slot to provide horizontal adjustability for the tubular member 32a. See FIG. 4. The tubular member 32 receives a pintle 32c secured to the underside of the cradle 33. With this construction, the pintle 32c is telescopically slidably received in the tubular member 32a, thereby permitting the cradle 33 to be lifted upwardly for disengaging the wrench end M(a) of the motor M from the valve stem 11 for facile changing of the pressure cylinder P when its gas content becomes depleted. Preferably, a protective cover C shown in phantom lines in FIG. 1 is mounted above the cradle platform by means of a series of posts 33a–33d to provide protection for the motor M.

The countertorque assembly can be readily mounted to and dismounted from the pressure cylinder P. To this end, as best seen in FIG. 2, the proximal end portion 31a of the arm 31 has a rectangular aperture 31' which is disposed with its lengthwise edges transverse to the lengthwise extent of the arm 31. The aperture 31' is sized to enable the arm proximal end portion 31a to be slid vertically downward along the body 10 of the valve V as the arm 31 is disposed into its installed position such as illustrated in FIG. 1.

To grip the valve body 10 positively, a pair of jaws 35 and 36 are disposed on opposite sides of the aperture 31' to form a yoke. As seen in FIG. 1., the jaws 35 and 36 extend in spaced parallel relation along the lengthwise extending edges of the aperture 31'. Each jaw is of identical construction to the other. The jaw 36, however, is mounted for movement relative to jaw 35 as will be discussed.

Each jaw, such as the jaw 35, has a horizontally elongate base portion 35a which extends along the lengthwise edge of the aperture 31'. The jaw 35 has an upstanding protrusion 35b which is adapted to extend along the flat surface of the valve body 10 opposite the surface 10a illustrated in FIG. 1.

The jaw 36 is mounted for sliding movement transverse to the aperture 31, i.e. lengthwise of the arm 31, along the upper surface of the proximal end portion 31a of the arm 31. To this end, an upstanding flange 37 is welded to the outer periphery of the proximal end portion 31a of the arm 31 for threadedly receiving a rotary operator 38 having wrench flats 39 that enables it to be rotated in one direction or another for displacing the jaw 36 toward or away from its companion jaw 35. The proximal end portion 31a of the arm 31 has a depending annular flange 31c which can rest upon an upper surface of the pressure cylinder P. Preferably, to provide clearance for ancillary structure, such as pressure regulators, etc., the upper portion of the proximal end portion 31a of the arm 31 is provided with diametrically opposed chamfers 31d and 31e.

In operation, the arm assembly 30 is installed on a valve V mounted on a pressure cylinder P by rotating the operator 38 by means of a wrench engaged with the wrench flats 39 to open the jaws 35 and 36. The proximal end portion 31a of the arm 31 is slid downwardly relative to the valve body 10 until the upstanding protrusions 35a and 36a on the jaws 35 and 36 confront the opposite flat surfaces of the valve body 10 in the manner illustrated in FIG. 1. When the rotary operator 38 is rotated, it displaces the jaw 36 toward the jaw 35 for bringing them both into lateral engagement with the opposed surfaces of the valve body 10 and thereby clamping the arm 31 to the valve body 10. The motor cradle 33 is next installed on the distal end 31b of the arm 31 and the motor M placed in the cradle 33 among the posts 33a–33d as illustrated. The valve stem 11 and the post and pintle assembly 32 are telescopically matingly engaged in the manner illustrated FIGS. 1 and 4.

When air pressure is supplied to the motor M via the air connection 20, and a sensed condition causes a signal to be supplied via conduit 21 to the motor control valve 23, the motor M rotates the valve stem into its closure position, e.g. in FIG. 1, clockwise looking downward. As the motor M rotates the valve stem 11 clockwise, the motor torque acts counterclockwise on the arm 31 via the interconnections of the post and pintle assembly 32 with the cradle 33. As a result, torque applied by the motor M to the valve stem 11 in the act of closing is countered by the countertorque assembly 30 which acts directly on 1the valve body itself, thereby positively closing the valve V without causing damage to it.

From the foregoing, it should be apparent that the present invention now provides a simple yet effective countertorque assembly which can be readily installed on a valve associated with a pressure and which can be disconnected readily from the valve to afford ready replacement of pressure cylinders when they become exhausted, or for other reasons.

While a preferred embodiment has been described in detail, various modifications, alterations, and changes may be made without departing from the spirit and scope of the present invention as defined in the appended claims.

I claim:

1. For use in mounting an automatic valve actuator to a pressure cylinder valve having a main valve body with a stem and a lateral outlet, a countertorque assembly comprising:

an elongate arm having a proximal end portion disposed adjacent to said valve body and a distal end portion remote from said valve body;

a cradle for supporting said valve actuator above said arm;

a post and pintle assembly telescopically extending between said cradle and said distal end portion of said arm for adjusting the distance of said cradle from said arm;

means for anti-rotatively fastening said proximal end portion to said valve body with said arm extending laterally of said valve stem; and means for connecting said actuator to said distal end portion of said arm;

whereby torque applied by the actuator to rotate the valve stem is countered by the valve body reacting against the arm.

2. Apparatus according to claim 1 wherein said valve body has opposed flat surfaces and said anti-rotative fastening means includes a yoke having opposed surfaces operatively engaging said flat valve body surfaces.

3. Apparatus according to claim 2 wherein said yoke has a valve body receiving aperture and said opposed yoke surfaces are provided by a pair of spaced confronting jaw members at least one of which is mounted for movement relative to the other into engagement with a confronting one of said valve surfaces.

4. Apparatus according to claim 3 including operator means on said proximal end portion of said arm for urging said moveable jaw member against said confronting one of said valve body surfaces.

5. Apparatus according to claim 4 wherein said operator means includes a flange on said proximal end portion of said arm and a threaded actuator threadedly mounted by said flange for rotation relative thereto while engaged with said moveable jaw member for displacing said jaw member relative to said valve body.

6. For use with a pressure cylinder valve having a valve body with a lateral outlet and co-lateral flat surfaces, the valve having an operating stem extending orthogonal to the outlet and within the valve body between its flat surfaces, a countertorque assembly adapted to mount an automatic valve actuator to said valve body for rotating the valve stem in response to a signal, said countertorque assembly comprising:

an elongate arm having a proximal end portion with an aperture for receiving said valve body flat surfaces, said arm extending laterally of said outlet and having a distal end portion remote from said proximal end portion;

a cradle for supporting said valve actuator above said arm, a post and pintle assembly telescopically extending between said cradle and said distal end portion of said arm on an axis parallel to said stem for adjusting the support height of said cradle;

a jaw assembly mounted on said arm proximal end portion for operatively engaging said valve body flat surfaces, said jaw assembly including an opposed pair of jaw members disposed in spaced confronting relation across said aperture, and operator means for displacing at least one of said jaw members toward the other for operatively engaging it with a confronting one of said valve body surfaces; and means on said distal end portion of said arm for releasably mounting said automatic valve actuator.

7. Apparatus according to claim 6 wherein said jaw member operator means includes a flange on said distal end arm portion and a threaded actuator extending between said flange and said moveable jaw member, said threaded actuator being threadedly received in said flange and being operable upon rotation to displace said moveable jaw member relative to its companion jaw member.

8. Apparatus according to claim 6 including a pressure cylinder mounting said valve body.

9. Apparatus according to claim 8 wherein said proximal end portion of said arm has an aperture for receiving said valve body and disposing said jaw member surfaces transverse to the lengthwise extent of said elongate arm, and an arcuate flange below said proximal end portion of said arm for resting on an upper hemispheric surface of a pressure cylinder when installed thereon.

10. For use with a pressure cylinder valve having a valve body with a lateral outlet and co-lateral flat surfaces, the valve having an operating stem extending between the flat surfaces of the valve body, a countertorque assembly adapted to mount an automatic valve actuator to said valve body for rotating the valve stem in response to a signal, said countertorque assembly comprising:

an elongate arm having a proximal end portion;

jaw means providing a pair of spaced confronting surfaces at least one of which is moveable relative to said arm into operative engagement with one of said valve body surfaces;

a cradle for supporting said valve actuator in spaced parallel relation above said arm;

a tubular member extending from said distal end portion of said arm on an axis parallel to said stem;

a pintle telescopically receiving said post to afford vertical adjustment and disengagement of said cradle from said arm;

operator means on said arm for urging said one moveable jaw means surface into releasable engagement with said one of said valve body surfaces; and means on a distal end portion of said arm remote from said pair of surfaces for fastening said valve actuator to said arm.

* * * * *